United States Patent
Miyazaki et al.

(10) Patent No.: US 7,105,964 B2
(45) Date of Patent: Sep. 12, 2006

(54) ELECTRIC ROTATING MACHINE

(75) Inventors: Taizo Miyazaki, Hitachi (JP); Yasuo Morooka, Hitachi (JP); Kiyoji Minegishi, Higashiura (JP); Jun Tamenaga, Oobu (JP)

(73) Assignees: Hitachi, Ltd., Tokyo (JP); Sumitomo Heavy Industries, Ltd., Tokyo (JP)

( * ) Notice: Subject to any disclaimer, the term of this patent is extended or adjusted under 35 U.S.C. 154(b) by 164 days.

(21) Appl. No.: 10/228,955

(22) Filed: Aug. 28, 2002

(65) Prior Publication Data

US 2003/0085628 A1 May 8, 2003

(30) Foreign Application Priority Data

Nov. 6, 2001 (JP) ........................ 2001-340134

(51) Int. Cl.
*H02K 7/06* (2006.01)
*F16H 13/06* (2006.01)

(52) U.S. Cl. .................. 310/75 R; 310/83; 475/183
(58) Field of Classification Search ............. 475/149, 475/183, 4–5; 310/75 R, 83, 99, 261
See application file for complete search history.

(56) References Cited

U.S. PATENT DOCUMENTS

| | | | | |
|---|---|---|---|---|
| 1,757,476 A | * | 5/1930 | Ture | 475/183 |
| 1,871,835 A | * | 8/1932 | Batchelder | 475/183 |
| 2,344,078 A | * | 3/1944 | Brissonnet et al. | 475/183 |
| 4,649,307 A | * | 3/1987 | Bech | 310/99 |
| 4,918,344 A | * | 4/1990 | Chikamori et al. | 310/83 |
| 5,931,759 A | * | 8/1999 | Otaki et al. | 475/195 |
| 6,157,105 A | * | 12/2000 | Kuragaki et al. | 310/75 R |
| 6,358,173 B1 | * | 3/2002 | Klemen et al. | 475/5 |
| 6,428,442 B1 | * | 8/2002 | Turgay et al. | 475/321 |
| 6,715,291 B1 | * | 4/2004 | Liao | 60/698 |
| 6,731,033 B1 | * | 5/2004 | Sakamoto | 310/75 R |

FOREIGN PATENT DOCUMENTS

| | | | |
|---|---|---|---|
| JP | 47005928 A | | 3/1975 |
| JP | 04185262 | * | 8/1992 |
| JP | 09047003 A | | 2/1997 |
| JP | 09510076 A | | 7/1997 |
| JP | 10-210709 | | 8/1998 |
| JP | 2001-12563 | | 1/2001 |
| WO | WO-9524761 A1 | | 9/1995 |

OTHER PUBLICATIONS

Japanese Office Action.
European Search Report dated Mar. 20, 2006 (Five (5) pages).

* cited by examiner

*Primary Examiner*—Darren Schuberg
*Assistant Examiner*—Heba Elkassabgi
(74) *Attorney, Agent, or Firm*—Crowell & Moring LLP

(57) ABSTRACT

An electric rotating machine has a rotor, a stator and a casing. A planetary roller mechanism constituted by a sun roller, a planet roller, a ring roller and a carrier is provided within the rotor so as to transmit the driving force of the rotor to the outside from a power shaft. Oil is sealed within the rotor or the casing. The planetary roller mechanism may be provided within the casing or at the outside of the rotor and, in this case, oil is sealed within the casing.

5 Claims, 9 Drawing Sheets

ELECTRIC ROTATING MACHINE

This application claims the priority of Japanese Application No. 2001-340134, filed Nov. 6, 2001, the disclosure of which is expressly incorporated by reference herein.

BACKGROUND AND SUMMARY OF THE INVENTION

The present invention relates to an electric rotating machine such as a motor, a generator etc. and, more particularly, relates to an electric rotating machine housing a transmission mechanism or a mechanism for synthesizing multi-axis rotation powers.

A conventional industrial electric rotating machines is a widely manufactured and sold geared motor provided with a transmission gear at the output shaft of the motor in order to transmit an input power to a desired load power and output rotation power. In general, the geared motor is large in size because of the volume of the gear mechanism. Such a geared motor is provided with a transmission mechanism within an electric rotating machine to miniaturize its size is disclosed in Japanese Patent Applications JP-A-10-210709 and JP-A-2001-12563.

SUMMARY OF THE INVENTION

However, the geared motor disclosed in JP-A-10-210709 and JP-A-2001-12563 employs a geared or meshed transmission element such as a gear sequence, a toothed belt, a friction transmission gear sequence as a transmission mean, so that the rotation speed varies depending on the rotational angle. When the geared transmission element is within the electric rotating machine, it is impossible to secure a relaxation area for absorbing the vibration since the member is too small. Thus, in such a case, disturbance applied to the rotor of the electric rotating machine becomes large as compared with the case where a transmission device is separately provided outside of the electric rotating machine. In recent years, a gap between the stator and the rotor of the electric rotating machine has become smaller so as to attain high efficiency. Thus, although it is required to strengthen a bearing so that the rotor and the stator do not contact to each other due to the vibration, there arises a problem that the size of the electric rotating machine becomes large when the bearing is strengthened.

On the other hand, there is a friction transmission element such as a friction wheel, a pulley etc. which serves as a mechanical power transmission means. In order to realize the friction transmission, it is required to supply oil for performing lubrication, cooling etc. In this case, if a means for merely dropping or throwing up the oil is employed, portions of the friction wheel coming off and falling from an oil film exfoliation portion thereof may damage the friction wheel or the electric rotating machine. Therefore, it is required to consider a suitable oil supply means.

Accordingly, an object of the present invention is to provide an electric rotating machine which is small in size and capable of supplying oil to a transmission portion thereof.

In order to provide this objective, the present invention provides an electric rotating machine having a rotor, a stator and a casing, the electric rotating machine including: a planetary roller mechanism provided within the rotor to transmit driving force of the rotor to outside of the electric rotating machine, whereby oil is sealed within the rotor or the casing.

According to the arrangement of the present invention, the electric rotating machine can be miniaturized and oil can be supplied to a transmission portion.

With such an arrangement, the rotor is preferably integrally formed or coupled with a ring roller of the planetary roller mechanism.

According to another embodiment, the electric rotating machine includes: a planetary roller mechanism provided within the casing or at outside of the rotor to transmit driving force of the rotor to outside of the electric rotating machine; whereby oil is sealed within the casing.

Also according to this embodiment, a ring roller of the planetary roller mechanism is coupled to the oil casing and the oil casing is coupled to a casing of the electric rotating machine. Preferably, the rotor is integrally formed or coupled with a sun roller of the planetary roller mechanism.

In a further embodiment, the electric rotating machine includes: a planetary roller mechanism provided within the casing or at outside of the rotor to transmit driving force of the rotor to outside of the electric rotating machine; and the rotor is in contact at plural points thereof with a planet roller of the planetary roller mechanism and a gravity center of the rotor is disposed at an inner side of a polyhedron having vertexes formed by contact points between the planet roller and the rotor.

According to such an arrangement, the electric rotating machine according to the present invention can be miniaturized and oil can be supplied to a transmission portion.

Other objects, advantages and novel features of the present invention will become apparent from the following detailed description of the invention when considered in conjunction with the accompanying drawings.

DESCRIPTION OF THE EMBODIMENTS

Hereinafter, the configuration of an electric rotating machine according to the first embodiment of the present invention will be explained with reference to FIGS. 1 and 2.

Figure 1:
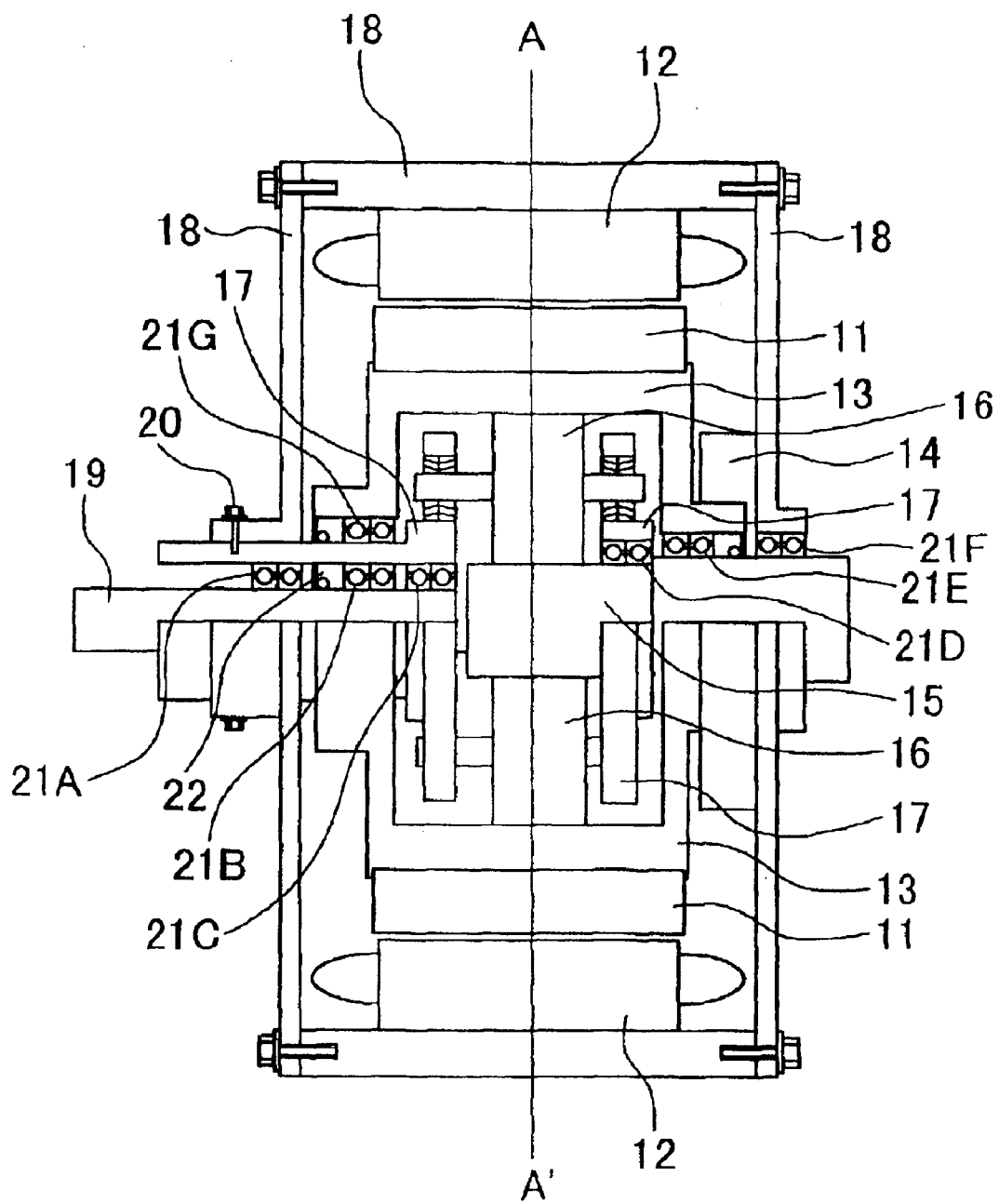
FIG. 1 is a sectional front view showing the configuration of the electric rotating machine according to the first embodiment of the present invention.
Figure 2:
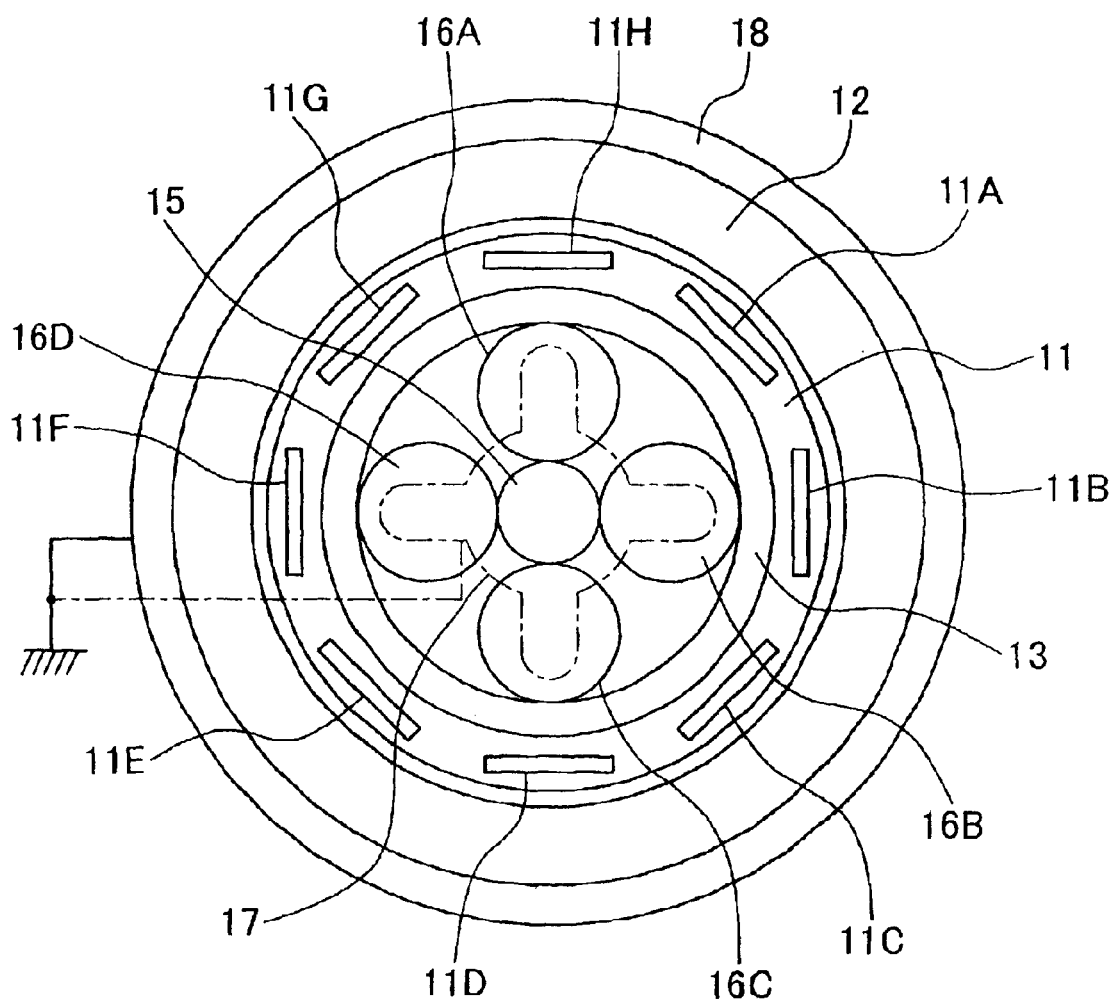
FIG. 2 is a sectional view cut along a line A–A' in FIG. 1.

FIG. 1 is a sectional front view showing the configuration of the electric rotating machine according to the first embodiment of the present invention. FIG. 2 is a sectional view cut along a line A–A' in FIG. 1.

The electric rotating machine according to the first embodiment is an inner rotor type electric rotating machine, and the explanation will be made as to a permanent magnet type synchronous motor as an example. Of course, the present invention can be applied to another type of electric rotating machine such as an induction motor, a DC motor etc. In the present invention, a planetary roller mechanism is provided within the electric rotating machine and the ring roller of the planetary roller mechanism is coupled to the rotor of the electric rotating machine.

A stator core 12 constituting a stator is fixed within a cylindrical shaped casing 18 forming the outer casing of the electric rotating machine. The rotor 11 is disposed in an opposed manner at the inner periphery of the stator core 12. As shown in FIG. 2, eight permanent magnets 11A, - - - , 11H are inserted within the rotor 11.

A planetary roller mechanism constituted by a sun roller 15, a planet roller 16, a ring roller 13 and a carrier 17 is provided between the rotor 11 and a power shaft 19 for taking out the output of the electric rotating machine to the outside. As shown in FIG. 2, the planet roller is configured by four planet rollers 16A, 16B, 16C and 16D. A casing 18 is provided with a magnetic pole position detector 14 for detecting the magnetic pole positions of the rotor.

The rotor 11 is coupled to the ring roller 13 through a rigid body. The rotor 11 and the ring roller 13 may be formed by the same member so long as sufficient rigidity and processing accuracy is attained.

The planet roller 16 is attached to the carrier 17 so as to be rotatable. The carrier 17 is disposed coaxially with the sun roller 15 and attached to the sun roller 15 so as to be rotatable by means of a bearing 21D. The planet roller 16 is made in rolling-contact with the sun roller 15 and a power is transmitted therebetween by utilizing viscose friction using Coulomb friction or oil viscosity. The planet roller 16 is also made in rolling-contact with the ring roller 13 and a power is transmitted therebetween by utilizing viscose friction using Coulomb friction or oil viscosity. In order to perform power transmission utilizing friction between the sun roller 15 and the planet roller 16 and between the planet roller 16 and the ring roller 13, a pressing force is required. Such a pressing force can be generated by subjecting the ring roller 13 to shrinkage fitting.

The power shaft 19 is rotatably supported by the carrier 17 through bearings 21A, 21B and 21C. The sun roller 15 is rotatably supported by the ring roller 13 through a bearing 21E. The sun roller 15 is rotatably supported by the casing 18 through a bearing 21F. The carrier 17 is rotatably supported by the ring roller 13 through a bearing 21G.

The planetary roller mechanism is a mechanism having three rotation shafts of the planet roller 16, the ring roller 13 and the carrier 17. In the case of using this planetary roller mechanism as a transmission mechanism, one of these three rotation shafts is restricted in its movement. In this case, the carrier 17 is fixed to the casing 18 by means of a fixing screw 20 thereby to act the planetary roller mechanism as the transmission.

When the electric rotating machine is used as a motor, the rotation output of the electric rotating machine, that is, the rotational power of the rotor 11 is inputted into the ring roller 13 and outputted to the sun roller 15 through the planet roller 16. The rotation of the sun roller 15 is taken out to the outside by means of the power shaft 19. In other words, the rotational power of the rotor 11 can be taken out to the outside from the power shaft 19 through a transmission path of the rotor 11, the ring roller 13, the planet roller 16, the sun roller 15 and the power shaft 19.

The electric rotating machine according to the embodiment is configured in a manner that the rotation speed of the motor is increased and outputted from the power shaft 19. Thus, the embodiment is particularly suitable for a subject intended to be rotated at a high speed, that is, a turbine pump, for example.

In order to realize the planetary roller mechanism, it is required to form a lubricant film or a traction oil film on the surface of each of the respective rollers. To this end, according to the embodiment, oil is sealed into the inside of the rotor 11. An oil seal 22 is realized by sealant or magnetic fluid seal etc. The oil seal 22 is provided for preventing the oil from leaking from the inside of the ring roller 13. When the oil is sealed within the rotor in this manner, it is expected that the electric rotating machine is free from the maintenance as compared with the case where grease is coated on the surfaces of the rollers, for example.

As described above, the embodiment is characterized in that the planetary roller mechanism is provided within the rotor and further oil is sealed within the rotor. The planetary roller mechanism is free from the backlash and the degree of swinging of the rotation shaft is small as compared with a gear. When the planetary roller mechanism is provided within the motor, the planetary roller mechanism serves to support the rotor. Thus, when the planetary roller mechanism is employed, the entire rigidity of the electric rotating machine can be improved as compared with the case of employing a gear mechanism which uses the same number of bearings as the embodiment. Therefore, even if the transmission mechanism is incorporated within the rotor, the degree of the eccentricity or decentering of the rotor is small and so the transmission mechanism little influences on the electric rotating machine.

As described above, according to the embodiment, the transmission mechanism can be incorporated within the rotor by utilizing the planetary roller mechanism. Further, since the oil is sealed into the rotor, the oil necessary for the planetary roller mechanism can be supplied thereto easily. As a result, the electric rotating machine can posses the function of the geared motor without enlarging the size of the electric rotating machine.

Figure 3:
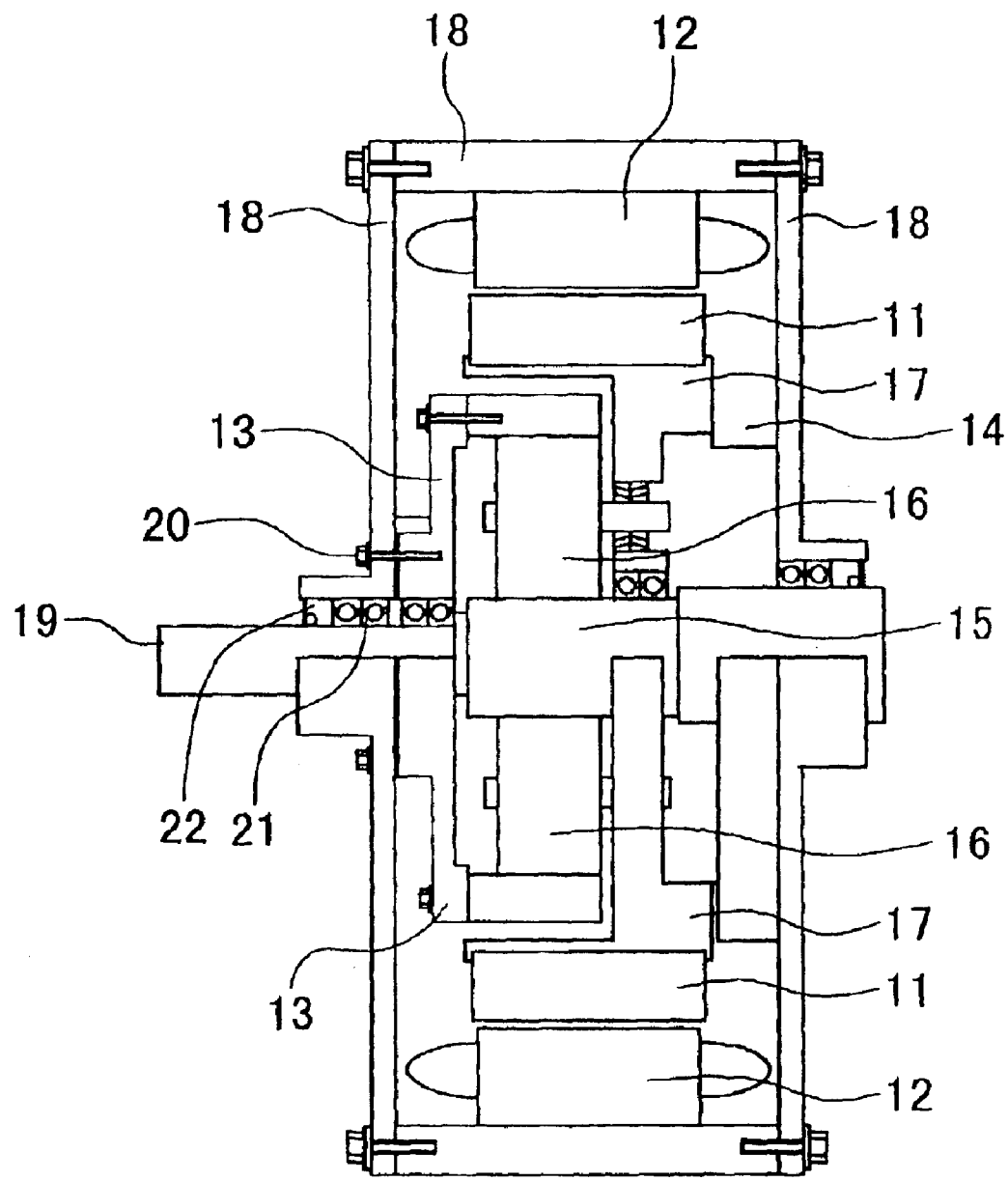
FIG. 3 is a sectional front view showing the configuration of the electric rotating machine according to the second embodiment of the present invention.

Next, the configuration of an electric rotating machine according to the second embodiment of the present invention will be explained with reference to FIG. 3. FIG. 3 is a sectional front view showing the configuration of the electric rotating machine according to the second embodiment of the present invention. In the figure, portions identical to those of FIG. 1 are referred to by the common symbols.

The electric rotating machine according to the embodiment is an inner rotor type electric rotating machine which is arranged in a manner that a planetary roller mechanism is provided within a rotor and oil is sealed within a casing.

According to the embodiment, a rotor 11 is coupled to a carrier 17. A ring roller 13 is fixed to the casing 18 by means of a fixing screw 20. A power shaft 19 is attached to a sun roller 15. The rotation force of the rotor 11 can be taken out from the power shaft 19 to the outside through a power transmission path of the rotor 11, the carrier 17, the planet roller 16, the sun roller 15 and the power shaft 19. This embodiment is configured in a manner that the rotation speed of the motor is increased and outputted from the power shaft 19. Thus, the embodiment is particularly suitable for a subject intended to be rotated at a high speed, that is, a turbine pump, for example.

The embodiment is also configured in a manner that oil is sealed within the casing 18. Thus, this embodiment is advantageous in that the oil transmits heat generated at a stator core 12 to the casing 18 thereby to cool the stator core.

As described above, according to the embodiment, the transmission mechanism can be incorporated within the rotor by utilizing the planetary roller mechanism. Further, since the oil is sealed into the casing, the oil necessary for the planetary roller mechanism can be supplied thereto easily. As a result, the electric rotating machine can posses the function of the geared motor without enlarging the size of the electric rotating machine.

Figure 4:
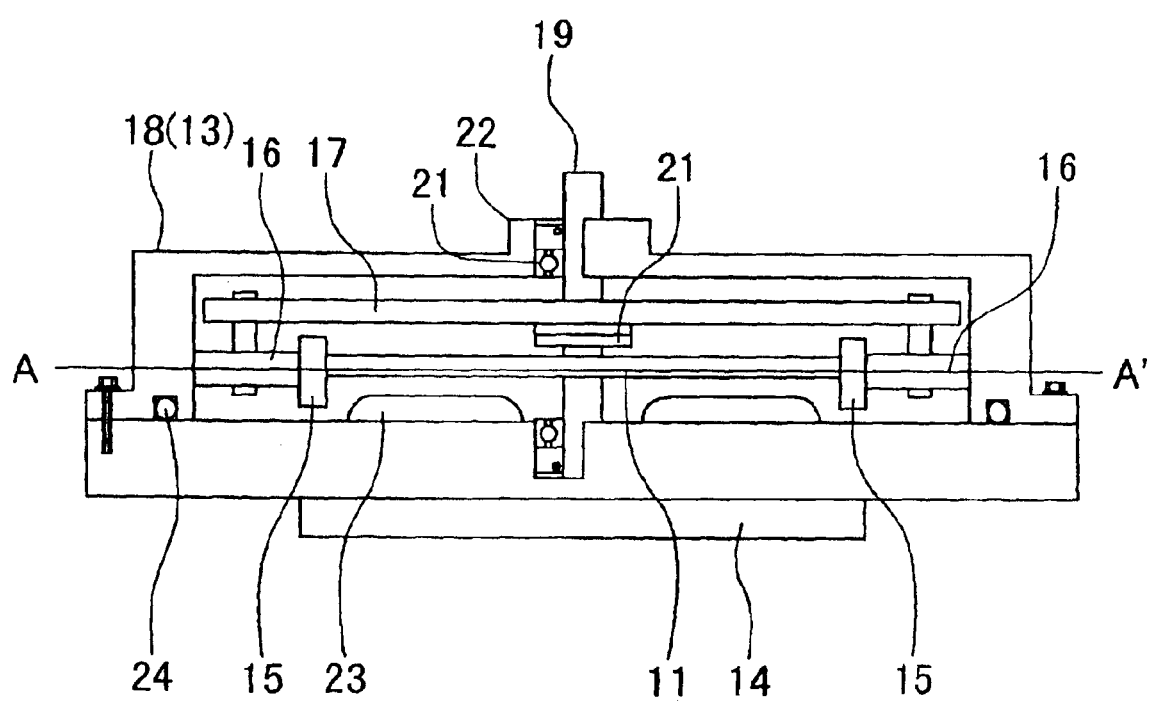
FIG. 4 is a sectional front view showing the configuration of the electric rotating machine according to the third embodiment of the present invention.
Figure 5:
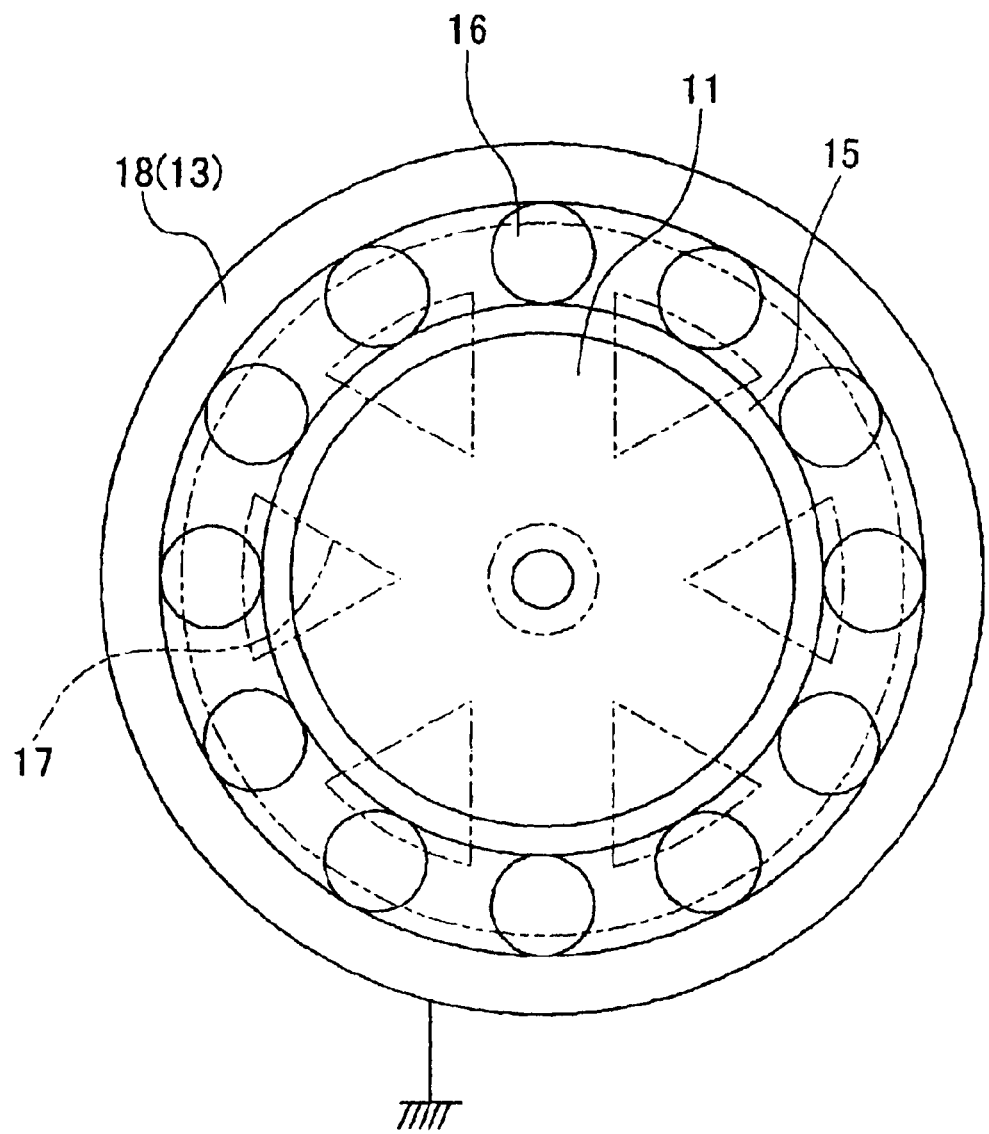
FIG. 5 is a sectional view cut along a line A–A' in FIG. 4.

Next, the configuration of an electric rotating machine according to the third embodiment of the present invention will be explained with reference to FIGS. 4 and 5. FIG. 4 is a sectional front view showing the configuration of the electric rotating machine according to the third embodiment of the present invention. FIG. 5 is a sectional view cut along a line A–A' in FIG. 4. In these figures, portions identical to those of FIG. 1 are referred to by the common symbols.

The electric rotating machine according to the embodiment is an inner rotor type electric rotating machine which is arranged in a manner that a planetary roller mechanism is provided outside of a rotor and oil is sealed within a casing.

The electric rotating machine according to the embodiment is a flat type axial motor. In this example, a casing 18 also serves as a ring roller 13 and a sun roller 15 is coupled to the rotor 11. As a bearing 21, one capable of supporting axial load is employed. A reference numeral 23 depicts a coil and 24 depicts an O ring used as an oil seal.

The rotation force of the rotor 11 can be taken out from a power shaft 19 to the outside through a power transmission path of the rotor 11, the sun roller 15, the casing 18 (the ring roller 13), the carrier 17 and the power shaft 19. This embodiment is configured in a manner that the rotation speed of the motor is decreased by a planetary roller mechanism to which the ring roller is fixed. Thus, this configuration of the embodiment is suitable for a subject intended to be rotated at a low speed with a high torque, that is, a machine tool, for example.

As described above, according to the embodiment, the transmission mechanism is provided at the outside of the rotor by utilizing the planetary roller mechanism. Further, since the oil is sealed into the casing, the oil necessary for the planetary roller mechanism can be supplied thereto easily. As a result, the electric rotating machine can posses the function of the geared motor without enlarging the size of the electric rotating machine.

Figure 6:
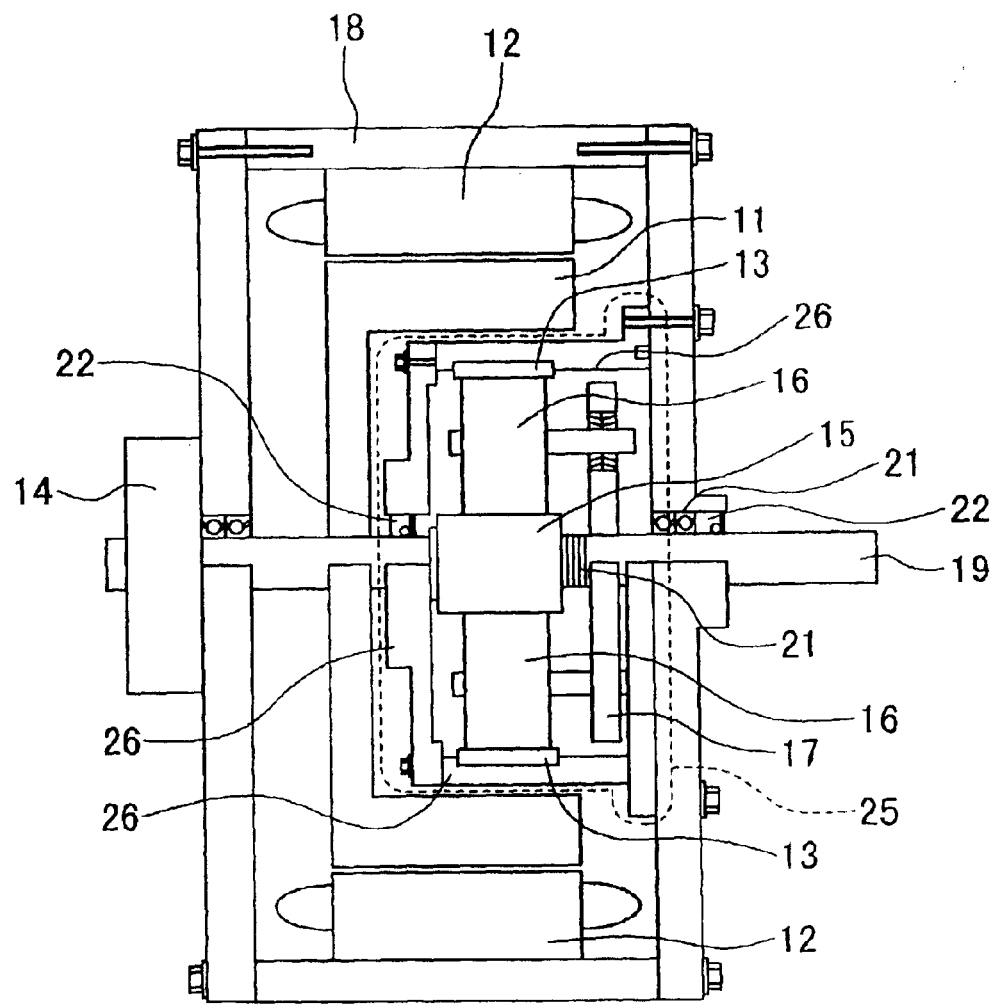
FIG. 6 is a sectional front view showing the configuration of the electric rotating machine according to the fourth embodiment of the present invention.

Next, the configuration of an electric rotating machine according to the fourth embodiment of the present invention will be explained with reference to FIG. 6. FIG. 6 is a sectional front view showing the configuration of the electric rotating machine according to the fourth embodiment of the present invention. In the figure, portions identical to those of FIG. 1 are referred to by the common symbols.

The electric rotating machine according to the embodiment is an inner rotor type electric rotating machine which is arranged in a manner that a planetary roller mechanism is provided within a casing and oil is sealed within the casing.

A planetary roller unit 25 is disposed within the rotor 11 and has the planetary roller mechanism therein. Oil is sealed within an oil casing 26 of the planetary roller unit. The casing of the planetary roller unit 25 is fixed to the casing 18 of the electric rotating machine. The planetary roller unit serves as a decelerator.

The rotation force of the rotor 11 can be taken out from a power shaft 19 to the outside through a power transmission path of the rotor 11, the sun roller 15, the planet roller 16, the carrier 17 and the power shaft 19. According to the embodiment, since the planetary roller mechanism also serves as a bearing, the number of the constituent elements of the electric rotating machine can be made smaller and so this embodiment is suitable for miniaturizing the electric rotating machine.

As described above, according to the embodiment, the transmission mechanism is provided within the casing by utilizing the planetary roller mechanism. Further, since the oil is sealed into the casing, the oil necessary for the planetary roller mechanism can be supplied thereto easily. As a result, the electric rotating machine can posses the function of the geared motor without enlarging the size of the electric rotating machine.

Figure 7:
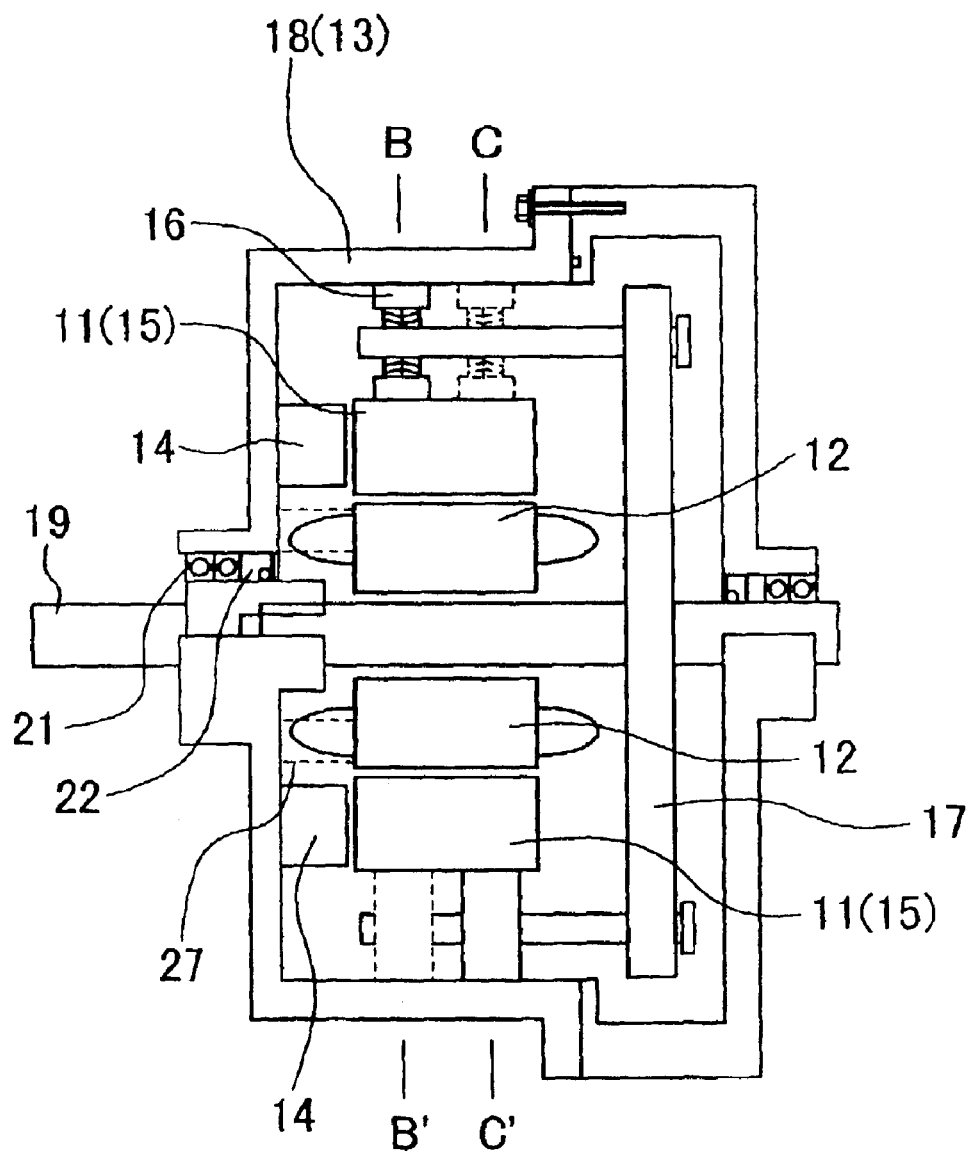
FIG. 7 is a sectional front view showing the configuration of the electric rotating machine according to the fifth embodiment of the present invention.
Figure 8:
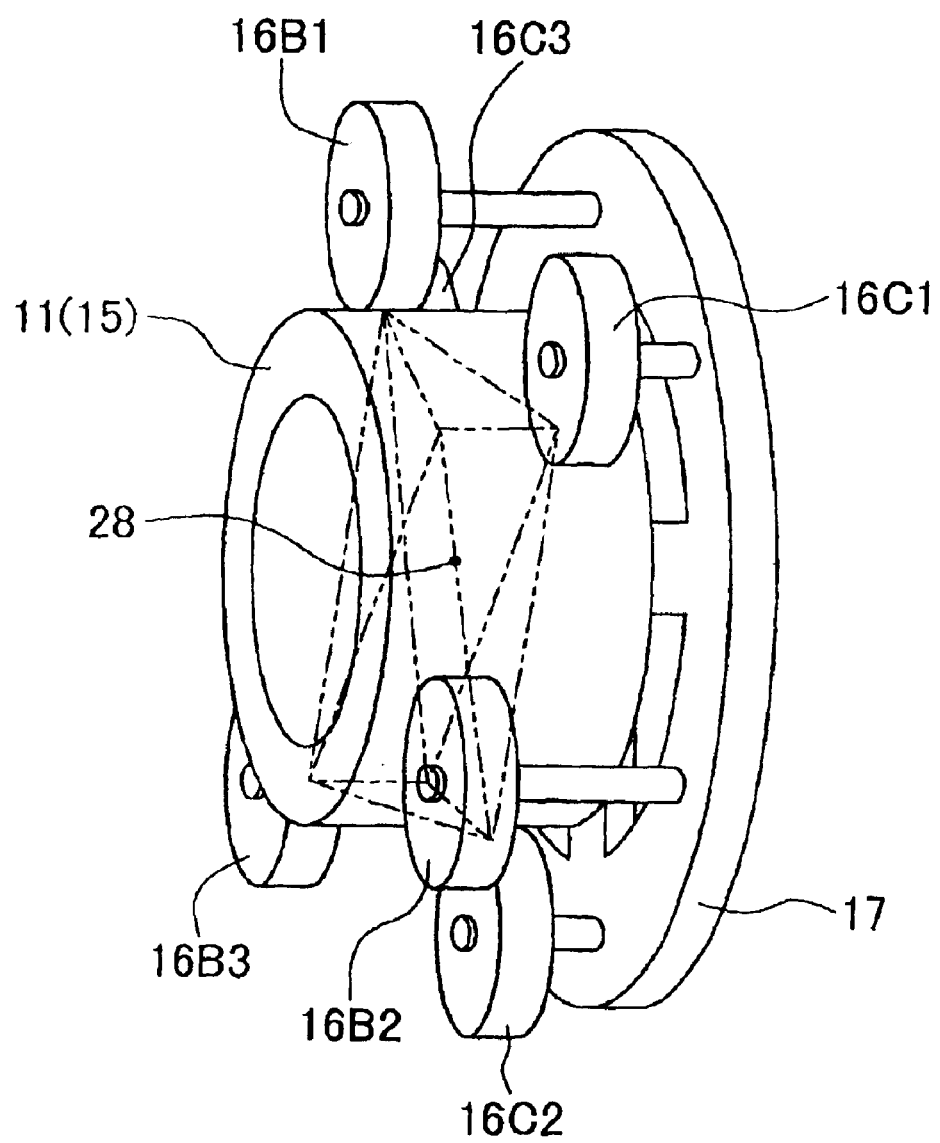
FIG. 8 is a perspective view of a main portion which shows the supporting structure of a rotor in the electric rotating machine according to the fifth embodiment of the present invention.

Next, the configuration of an electric rotating machine according to the fifth embodiment of the present invention will be explained with reference to FIGS. 7 and 8. FIG. 7 is a sectional front view showing the configuration of the electric rotating machine according to the fifth embodiment of the present invention. FIG. 8 is a perspective view of a main portion which shows the supporting structure of a rotor in the electric rotating machine according to the fifth embodiment of the present invention. In these figures, portions identical to those of FIG. 1 are referred to by the common symbols.

The electric rotating machine according to the embodiment is an outer rotor type electric rotating machine which is arranged in a manner that a planetary roller mechanism is provided at the outside of the rotor and oil is sealed within a casing.

As shown in FIG. 7, the rotor 11 is disposed at the outside of a stator core 12 thereby to constitute the outer rotor type electric rotating machine. The rotor 11 also serves as a sun roller 15 and the casing 18 also serves as a ring roller 13. The oil is sealed within the casing 18. The stator core 12 is coupled to the casing 18 by means of a supporting portion 27.

The rotation force of the rotor 11 can be taken out from a power shaft 19 to the outside through a power transmission path of the rotor 11, the planet roller 16, the carrier 17 and the power shaft 19. In general, the outer rotor type electric rotating machine tends to be complicated in the supporting structure of the rotor 11. However, according to the embodiment, since the planet roller 16 supports the rotor 11 from the outside thereof, the number of the bearings can be reduced and so this embodiment can advantageously miniaturize the size of the electric rotating machine.

Further, in the embodiment, there are six planet rollers 16B1, 16B2, 16B3, 16C1, 16C2 and 16C3, in which the three planet rollers 16B1, 16B2 and 16B3 constitute a first set and the remaining three planet rollers 16C1, 16C2 and 16C3 constitute a second set. The first set of the planet rollers support the left side circumference of the rotor 11, that is, a surface along a line B–B' shown in FIG. 7, whilst the second set of the planet rollers support the right side circumference of the rotor 11, that is, a surface along a line C–C' shown in FIG. 7. To this end, the gravity center 28 of the rotor 11 is disposed within a polyhedron which vertexes are formed by contact points between the planet roller 16 and the rotor. Since the supporting system for the rotor 11 is configured in this manner in the outer rotor type electric rotating machine, the supporting rigidity of the rotor 11 can be improved, degree of vibration can be reduced and life time can be elongated.

As explained above, according to the embodiment, the transmission mechanism is provided at the outside of the rotor by utilizing the planetary roller mechanism. Further, since the oil is sealed into the casing, the oil necessary for the planetary roller mechanism can be supplied thereto easily. As a result, the electric rotating machine can posses the function of the geared motor without enlarging the size of the electric rotating machine.

Next, the supporting structure of the rotor in the electric rotating machine according to the first and second embodiments will be explained with reference to FIG. 9.

Figure 9:
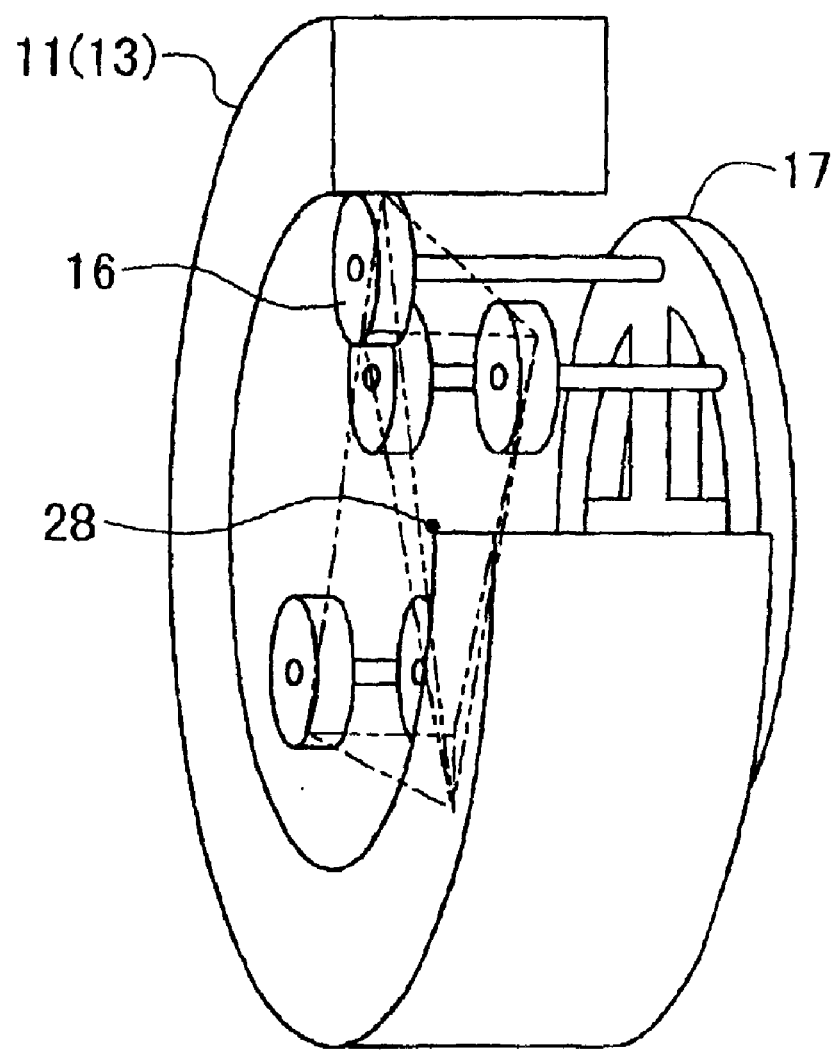
FIG. 9 is a perspective view showing a main portion of the supporting structure of the rotor in the electric rotating machine according to the first and second embodiments.

FIG. 9 is a perspective view showing a main portion of the supporting structure of the rotor in the electric rotating machine according to the first and second embodiments. In the figure, portions identical to those of FIG. 1 are referred to by the common symbols.

In the first and second embodiments, the supporting structure of the rotor shown in FIG. 9 is applied to the inner rotor type electric rotating machines shown in FIGS. 1 and 3, respectively. In these embodiments, the planet roller 16 supports the rotor 11 from the inner side thereof and the rotor 11 also serves as the ring roller 13. In FIG. 9, the constituent elements such as the sun roller and the stator core are omitted to merely simplify the drawing.

In these embodiments, there are also six planet rollers 16 and three of these six rollers constitute one set and the remaining three constitute the other set. The one set of the planet rollers support the left side circumference of the rotor 11, whilst the other set of the planet rollers support the right side circumference of the rotor 11. To this end, the gravity center 28 of the rotor 11 is disposed within a polyhedron formed by contact points between the planet roller 16 and the rotor. According to these embodiments, since the rotor can be supported without using a bearing, the bearings can be simplified in their configuration or can be eliminated. In this manner, the supporting structure of the rotor can contribute to the miniaturization of the entire size of the electric rotating machine.

Although, the explanation has been made as to the case where the transmitter is contained within the electric rotating machine in the aforesaid explanation, the three rotation shafts of the planetary roller mechanism may be coupled to separate subjects, respectively. For example, in FIG. 1, if the carrier 17 is coupled to an engine without using the fixing screw 20 and the power shaft 19 is coupled to an axle, an engine-motor hybrid car can be realized.

In this manner, according to the present invention, the electric rotating machine can be provided which is small in size and capable of supplying oil to a transmission portion thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric rotating machine having a rotor, a stator and a casing, said electric rotating machine comprising:
   a planetary roller mechanism provided at least one of within the casing and proximal to an outer circumference of the rotor to transmit driving force of the rotor to outside of the electric rotating machine, and wherein
   the rotor makes contact at plural points thereof with a planet roller of the planetary roller mechanism and a gravity center of the rotor being disposed at an inner side of a polyhedron whose vertexes are formed by contact points between the planet roller and the rotor.

2. The rotating machine according to claim 1, wherein the planetary rotating mechanism is provided within the casing.

3. The rotating machine according to claim 1, wherein the planetary rotating mechanism is provided proximal to said outer circumference of the rotor.

4. The electric rotating machine according to claim 1 further including at least one additional planet roller.

5. The rotating machine according to claim 4 wherein said at least one additional planet roller includes five additional planet rollers.

* * * * *